June 11, 1963
R. A. MAHAFFY ETAL
3,093,206
APPARATUS FOR MEASURING FORCES
Filed March 24, 1959
4 Sheets-Sheet 1
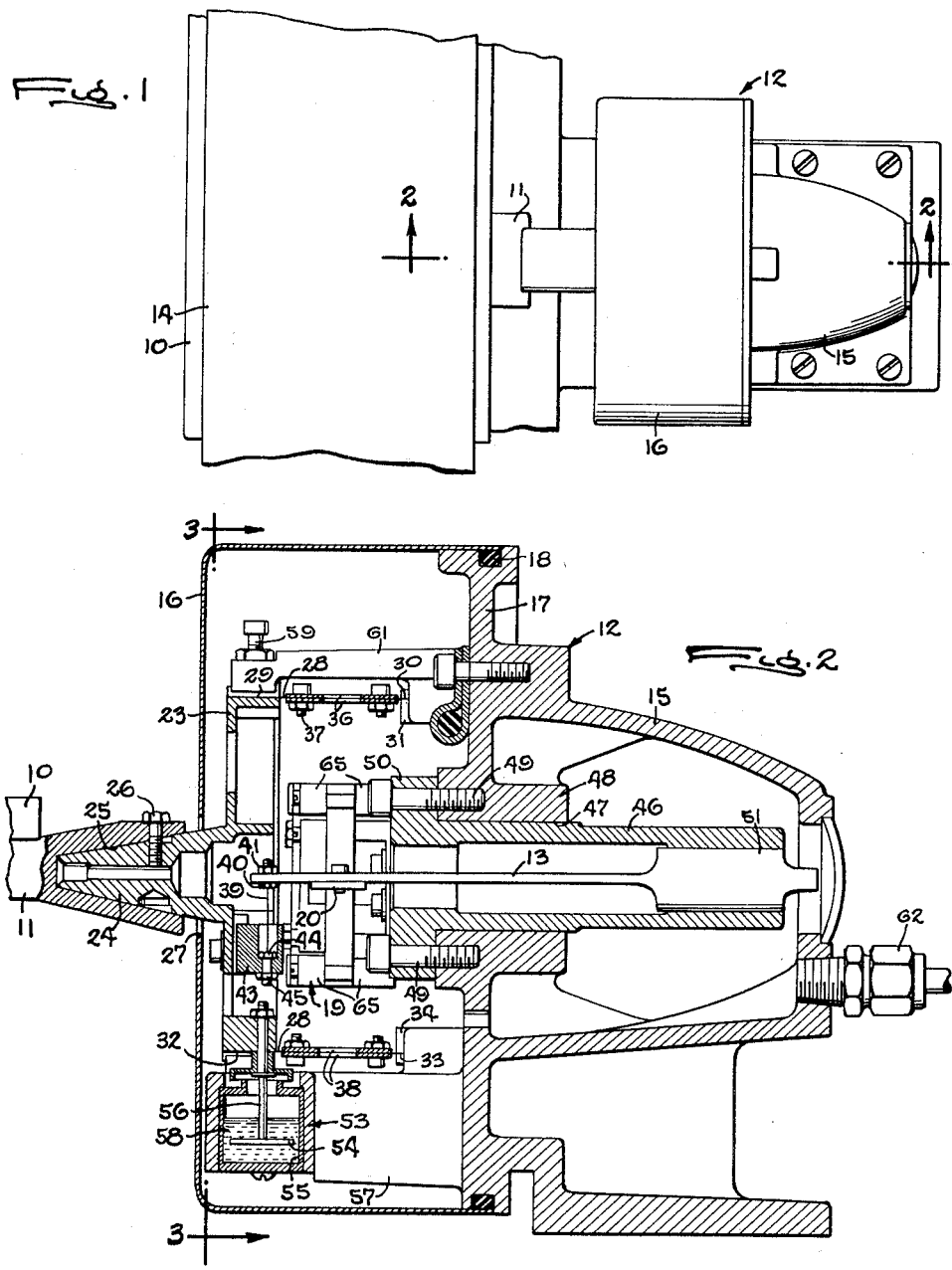
INVENTORS
Reid A. Mahaffy
John R. Harder
by Wolfe, Hubbard, Voit & Osann
ATTORNEYS

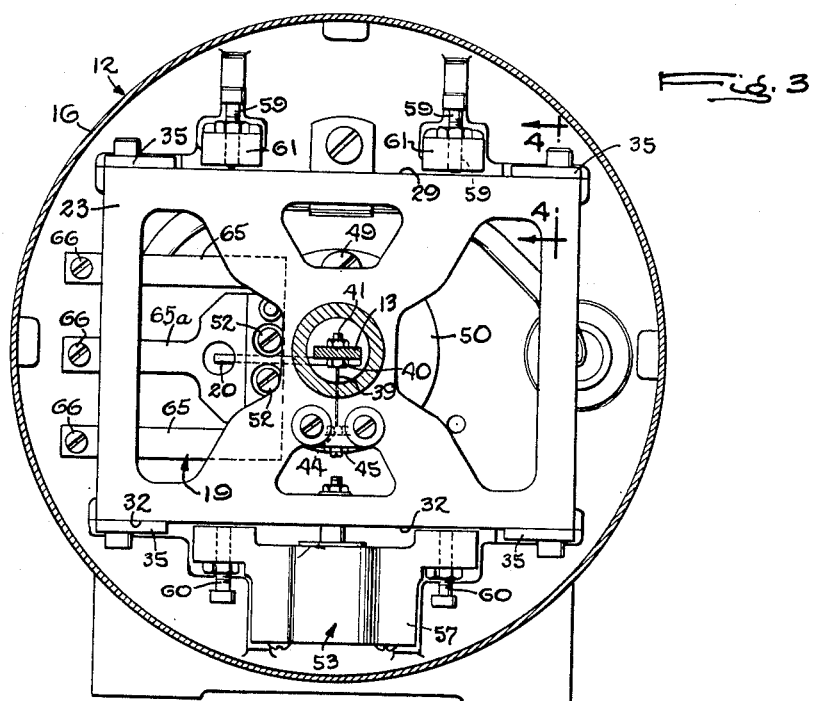
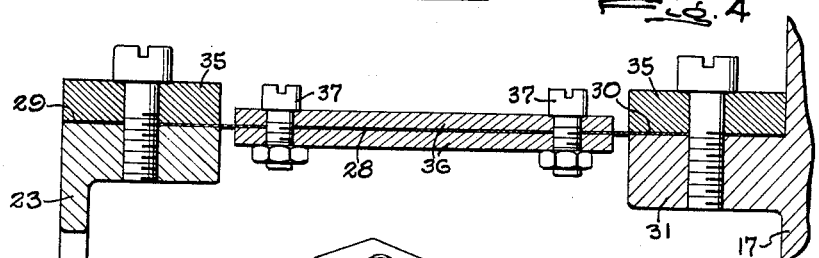
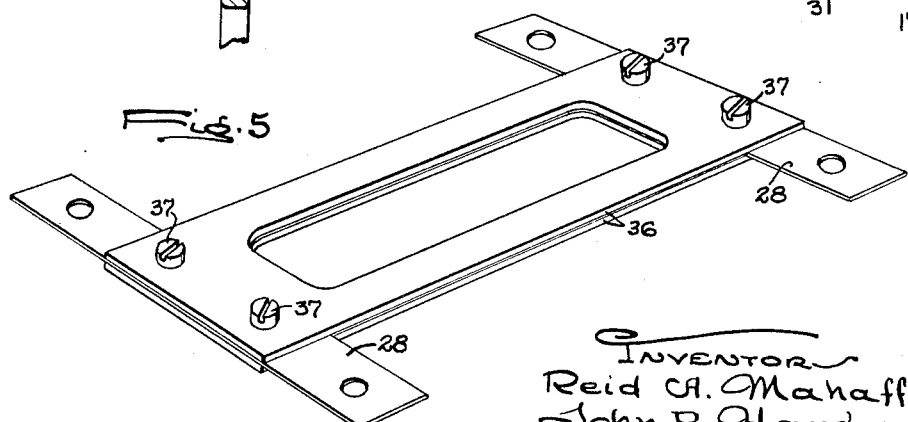

June 11, 1963
R. A. MAHAFFY ETAL
3,093,206
APPARATUS FOR MEASURING FORCES
Filed March 24, 1959
4 Sheets-Sheet 3
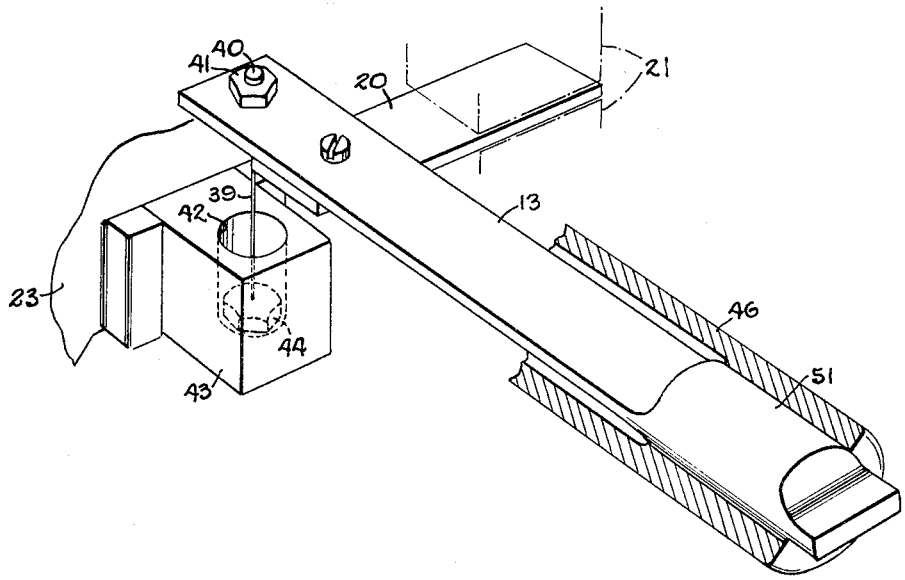
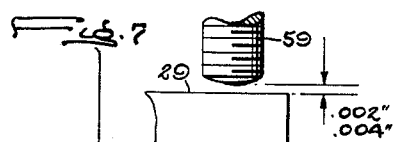
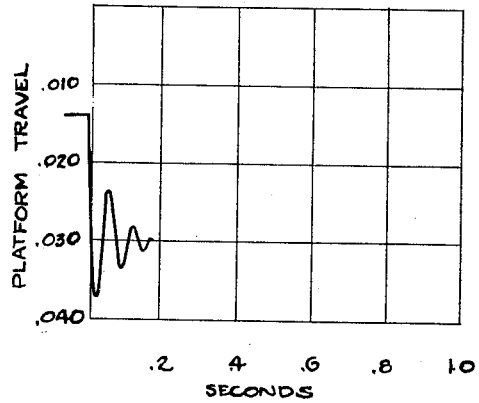
INVENTORS
Reid A. Mahaffy
John R. Harder
by Wolfe, Hubbard, Voit & Osann
ATTORNEY

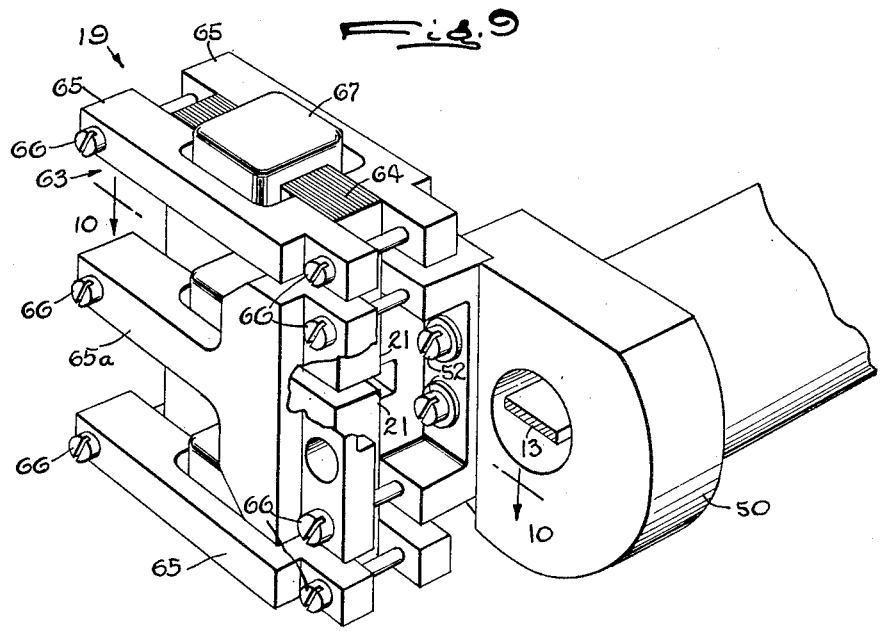
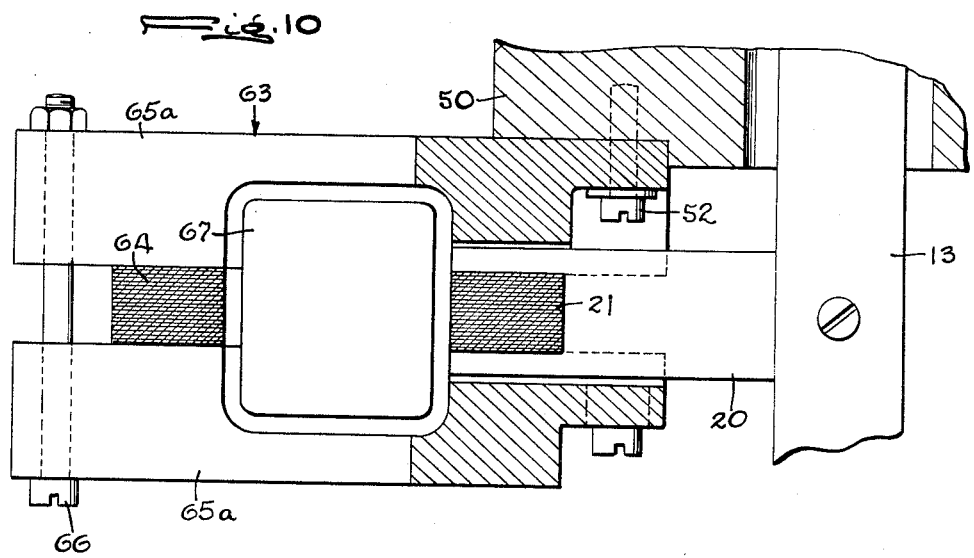

United States Patent Office 3,093,206
Patented June 11, 1963

3,093,206
APPARATUS FOR MEASURING FORCES
Reid A. Mahaffy, Montclair, and John R. Harder, Cedar Grove, N.J., assignors, by mesne assignments, to Bartelt Engineering Company, Inc., Rockford, Ill., a corporation of Delaware
Filed Mar. 24, 1959, Ser. No. 801,530
9 Claims. (Cl. 177—228)

This invention relates to devices for measuring the magnitude of forces such as a weighing scale in which the force being measured is the weight of an article. More particularly, the invention has reference to a device in which the article to be weighed is placed on a scale platform which is mounted to deflect vertically under the weight of the article and which is balanced by the force of a cantilever spring.

The general object of the invention is to provide a new and improved apparatus of the above character which is accurate regardless of the point on the platform at which the force is applied, which responds rapidly to the force so as to give almost an immediate indication of the magnitude of the force and which is not appreciably affected in its accuracy by either ambient temperature changes or extraneous vibrations.

A more detailed object is to achieve the improved accuracy and the short period of response by constructing the movable parts of the device so as to have a high natural frequency.

Another object is to support the platform in a novel manner so as to resist twisting, bending and cocking and thereby maintain the accuracy of the device regardless of the point the force is applied to the platform.

The invention also resides in the novel construction and arrangement of the parts so as to minimize the effect of temperature on the accuracy of the device.

Other objects and advantages of the invention will become apparent from the following detailed description taken in connection with the accompanying drawings, in which FIGURE 1 is a fragmentary plan view of a weighing scale embodying the novel features of the present invention.

FIG. 2 is an enlarged fragmentary sectional view taken along the line 2—2 in FIG. 1.

FIG. 3 is a sectional view taken along the line 3—3 in FIG. 2.

FIG. 4 is an enlarged fragmentary sectional view taken along the line 4—4 in FIG. 3.

FIG. 5 is a perspective view of a portion of the connection between the platform and the spring.

FIG. 6 is a fragmentary perspective view of the spring and a part of the connection between the spring and the platform.

FIG. 7 is an enlarged fragmentary view illustrating the limits of motion of the scale.

FIG. 8 is a chart showing the movement of the platform upon receiving an article to be weighed.

FIG. 9 is a fragmentary perspective view of the electromagnetic transducer used to measure deflection of the platform.

FIG. 10 is a fragmentary sectional view taken along the line 10—10 in FIG. 9.

While the invention is applicable to devices for measuring forces of various kinds, it is shown in the drawings for purposes of illustration as embodied in a weighing scale which includes a horizontal platform 10 arranged to deflect downwardly in response to the weight of an object on it. The platform is mounted on the free end of an arm 11 projecting horizontally from the casing or base 12 of the scale and connected to a cantilever spring 13 (FIG. 2) which balances the load on the platform. Articles to be weighed may be delivered continuously by an endless belt 14 which has a run extending over the scale platform. The casing encloses the parts of the scale and includes a hollow casting 15 and a cup-shaped cover 16 fitted over the forward wall 17 of the casting and sealed by a gasket 18.

Deflection of the spring 13 is a measure of the weight of an object on the platform 10 and this deflection is utilized to produce a signal which varies in magnitude according to such weight. Herein, this is achieved through the use of a suitable electromagnetic transducer 19 which converts the deflection of the spring into an electric signal which varies in magnitude with the amount of spring deflection. The transducer comprises an armature 20 (FIGS. 3 and 6) fastened to the spring 13 and projecting laterally in between opposed pole pieces 21 (FIG. 9). In a manner well-known in the art, movement of the armature relative to the pole pieces varies the magnitude of the signal.

In accordance with the present invention, the weigher is constructed in a novel manner so that it responds rapidly and accurately to the weight of an article on the platform 10 regardless of changes in the ambient temperature and regardless of the position of the article on the platform. To these ends, the platform is connected to the spring through parts which have a high natural frequency and which are supported in the casing 12 in such a way that they resist twisting and bending. Moreover, the parts are constructed and arranged to compensate for temperature changes thereby substantially to eliminate inaccuracies which might otherwise be caused by the resulting expansion and contraction.

In the present instance, the platform 10 is connected to the spring 13 through the medium of a rectangular frame 23 of appreciable mass. At its center, the frame is formed with an outwardly projecting conical boss 24 which is received in a mating bore 25 in the inner end of the arm 11 of the platform, the arm and the boss being held together by a screw 26. As shown in FIGS. 2 and 3, the frame is disposed near the front of the cover 16 in a vertical plane extending transversely of the spring 13 and the boss 24 projects out through a hole 27 in the cover 16.

To support the frame 23 in the casing 12 for vertical movement while preventing the frame from twisting, turning or cocking, flexure members 28 hinge the corners of the frame to the casing. Herein, each flexure member is a flat strip of resilient metal. One end portion of each of the upper strips is disposed against the top surface 29 of the frame while the opposite end portions lie against the top surfaces 30 (FIG. 4) of ears 31 integral with the wall 17 of the casting 15. Similarly, the lower strips are flat against the bottom surface 32 of the frame and the under surface 33 of ears 34 on the wall 17. The surfaces 29 and 32 are accurately machined to be parallel to each other and the surfaces 30 and 33 also are finished accurately to be parallel and horizontal. Plates 35 are bolted to the frame and the ears 31 and 34 and overlie the end portions of the strips to clamp the latter in place. Rectangular plates 36 (FIGS. 4 and 5) span the upper strips 28 with one above and the other below the strips and overlie the central portions of the strips. The ends of the plates are clamped to the strips by bolts 37 leaving a short length of each strip free at each side of the plates. Similar plates 38 are clamped to the lower strips. The foregoing arrangement provides a frictionless hinge between the frame 23 and the casing 12 and permits only generally vertical movement of the frame while having a high natural frequency.

Connecting the frame 23 to the spring 13 is a short wire 39 of circular cross section. The upper end of the wire is welded, brazed or otherwise secured to a bolt 40 (FIG. 6) which projects through the spring near the outer free end thereof and is threaded into a nut 41. The lower end projects through a bore 42 in a block 43 bolted to the inner side of the frame and is similarly secured to a bolt 44 (FIG. 2), the latter being held to the block by a nut 45. Thus, the frame is suspended from the spring by the wire 39.

To support the spring 13 in the casing 12, a tube 46 projects through a hole 47 in a boss 48 formed in the wall 17 of the casting 15 and extends rearwardly from the boss. Bolts 49 project through a flange 50 on the forward end of the tube and are threaded into the boss 48 to secure the tube to the wall 17. The rear end portion 51 of the spring 13 is enlarged and is pressed into the tube 46 near the rear thereof, the forward end of the spring projecting out beyond the tube. The stationary parts of the transducer 19 are secured to the flange 50 by screws 52.

Damping the spring 13 is a dashpot 53 (FIG. 2) which comprises a piston 54 disposed in a cylinder 55 and mounted on the lower end of a rod 56 depending from the frame 23. The cylinder is fastened to a stud 57 integral with the wall 17 and may, if desired, contain a liquid 58. Vertical movement of the frame 23 and hence deflection of the spring 13 is limited by adjustable stops 59 and 60. The stops 59 are in the form of screws threaded through projections 61 on the wall 17 to oppose the upper surface 29 of the frame 23 while the stops 60 also are screws threaded through the stud 57 and opposing the frame surface 32. With a scale constructed in accordance with the invention, the weighing may be accomplished with a comparatively small deflection of the spring 13. For example, the stops 59 and 60 may, as illustrated in FIG. 7, be set to permit a travel of the frame 23 on the order of .030 of an inch while leaving only several thousandths of an inch clearance at each end of the travel.

It will be observed that the movable parts of the scale have a high natural frequency due, among various factors, to the small deflection of the spring 13, the comparatively large mass of the frame 23 and the short active portions of the strips 28. This, combined with the action of the dashpot 53, stabilizes the spring 13 sufficiently to produce an accurate signal of weight in an extremely short period of time. For example, as illustrated in the chart of FIG. 8, the spring may be sufficiently stabilized within 0.2 of a second. In this connection, it is important to note that the spring need not be brought completely to rest since conventional apparatus may be used to interpret a fluctuating signal once the latter is brought within the narrow limits dictated by the accuracy required.

By using the spring strips 28 to connect the frame 23 to the casing 12, the accuracy of the weighing is not substantially affected by the position of the article on the platform 10. Thus, the vertical components of the tension and compression forces in the strips 28 are equal regardless of where the article is disposed along the axis of the spring 13 which, therefore, is deflected only an amount corresponding to the weight of the article. Moreover, the strips 28 also produce a force couple tending to resist turning of the frame 23 about the axis of the spring so that the accuracy is not affected by the article being positioned on one side or the other of the spring axis. As a result, the article may be weighed at any time during the travel of the article across the platform 10.

With the foregoing arrangement, the flexure members 28 and the wire 39 are weak as compared to the spring 13 so that the spring is the only significant load carrying member. As a result, it is only necessary to compensate for temperature changes in the spring and its supporting elements to maintain the accuracy of the device. Such compensation is achieved by making the parts which elongate longitudinally of the spring from materials which have substantially the same coefficient of thermal expansion and similarly by making the parts which elongate transversely from materials having approximately equal coefficients. Thus, the tube 46, the spring 13 and the flexure strips 28 have the coefficient of steel while the base 15, the frame 23 and the flexure clamps 36, 38 are made of aluminum. In this way, the relative positions of the parts remain substantially unchanged even though the parts expand and contract with ambient temperature changes.

The temperature effect is reduced further by the particular construction of the transducer together with the manner in which it is incorporated in the measuring device. Thus, the frame 63 of the transducer is made from a material which is non-magnetic but still has approximately the same coefficient of thermal expansion as the core 64 which forms the pole pieces 21. For example, the core may be made of a nickel-iron alloy and the frame may be made of practically pure molybdenum. Also, the frame is made as two sets of spaced fingers, each set being composed of end fingers 65 and a center finger 65a. Through the medium of bolts 66, the two sets of fingers clamp the core and the coils 67 between them. Since elongation due to temperature is a function of the length, the use of fingers reduces the effective vertical length of the transducer frame and hence the amount of elongation. Moreover, what small amount of elongation that does occur is minimized in its effect by arranging the frame symmetrically relative to the spring 13 in a vertical plane.

Another factor reducing the effect of temperature is the mounting of the spring 13 in the tube 46. It will be seen that the tube extends rearwardly from its mounting on the boss 48 while the spring extends forwardly from its mounting by the enlarged portion 51. Thus, expansion of the spring is offset by expansion of the tube so that there is little or no shifting of the wire 39. By using the latter to connect the spring to the frame 23, such slight shifting as might occur under some circumstances does not affect the accurate transmission of the deflection of the platform 10 to the spring 13.

To reduce the effect of temperature change still further, a gas, such as air, under pressure may be delivered continuously to the interior of the casing 12 from a suitable source (not shown) through a fitting 62 in the rear of the casting 15. The air escapes through the opening 27 in the cover 16 and tends to prevent wide fluctuations in the temperature of the parts. This air, being under pressure, also prevents foreign matter from entering the casing 12.

This application is a continuation-in-part of our copending application, Serial No. 724,191, filed March 26, 1958, now abandoned.

We claim as our invention:

1. A force measuring device comprising a rigid base, a cantilever spring supported at one end on said base, a rigid member disposed adjacent the free end of said spring and in a plane extending transversely of the longitudinal axis of the spring, a plurality of flat resilient strips angularly spaced around said axis and connecting said member and said base, said strips being parallel to each other to support said member on said base for movement in only one direction transversely of said axis, rigid plates clamped to the central portions of said strips to permit the strips to flex only between said plates and said base and between said plates and said member, a wire extending in said one direction and intersecting said axis, said wire being connected at one end to the free end of said spring and at the other end to said member, and means responsive to deflection of said spring and operable to produce a signal corresponding to the magnitude of such deflection.

2. A force measuring device as defined in claim 1 in which said strips have substantially the same coefficient of thermal expansion as said spring and said member and said plates have substantially the same coefficient of thermal expansion as said base.

3. A force measuring device as defined in claim 1 in which said strips have substantially the same coefficient of thermal expansion as said spring.

4. A force measuring device having, in combination, a base, a cantilever spring, means including first elements supporting one end of said spring on said base, a member to which the force to be measured is applied, means including and second elements supporting said member, said latter means connecting said member to the other end of said spring whereby the spring is deflected in accordance with the magnitude of said force, the said first elements and the ones of said second elements which elongate with temperature changes in a direction longitudinally of said spring having substantially the same coefficient of thermal expansion as the spring and the ones of said second elements which elongate in a direction transversely of the spring having substantially the same coefficient of thermal expansion as each other.

5. A force measuring device having, in combination, a rigid base, an elongated tube rigidly connected at one end to said base, an elongated spring disposed within said tube with one end connected to the free end of the tube and the other end extending outwardly beyond said one tube end, a member adapted to receive the force to be measured, means connecting said member to the free end of said spring, and mechanism responsive to the deflection of said spring and operable to produce a signal corresponding to the magnitude of such deflection.

6. A force measuring device as defined in claim 5 in which said tube and said spring are made of materials having substantially the same coefficient of thermal expansion.

7. A force measuring device comprising a rigid base, a cantilever spring supported at one end on said base, a rigid member disposed adjacent the free end of said spring and in a plane extending transversely of the longitudinal axis of the spring, a plurality of flat resilient strips angularly spaced around said axis and connecting said member and said base, said strips being parallel to each other to support said member on said base for movement in only one direction transversely of said axis, a wire extending in said one direction and intersecting said axis, said wire being connected at one end to the free end of said spring and at the other end to said member, means responsive to deflection of said spring and operable to produce a signal corresponding to the magnitude of such deflection, said base including a casing covering said spring, said member, said strips, said wire and said means, and means for continuously admitting a gas under pressure to the interior of said casing, said casing having a restricted opening to permit the gas to escape.

8. A force measuring device having, in combination, a rigid base, an elongated tube rigidly connected at one end to said base, an elongated spring disposed within said tube with one end connected to the free end of the tube and the other end projecting outwardly beyond said one tube end, a member adapted to receive the force to be measured, a rigid frame disposed adjacent the free end of said spring and in a plane extending transversely of the spring, means rigidly connecting said frame to said member, a plurality of flat resilient strips angularly spaced around said axis and connecting said frame to said base, said strips being parallel to each other to support said frame on said base for movement back and forth in one direction, a wire extending in said one direction and intersecting the longitudinal axis of said spring, one end of said wire being connected to said spring and the other end to said frame, and means responsive to deflection of said spring and operable to produce a signal correlated with such deflection.

9. A force measuring device as defined in claim 8 in which said tube, said spring and said strips are made from materials having substantially the same coefficient of thermal expansion.

References Cited in the file of this patent
UNITED STATES PATENTS

| | | |
|---|---|---|
| 2,130,648 | Mott-Smith | Sept. 20, 1938 |
| 2,159,082 | Hartley | May 23, 1939 |
| 2,640,267 | Geier | June 2, 1953 |
| 2,709,790 | Swanson | May 31, 1955 |
| 2,716,546 | Stelzer | Aug. 30, 1955 |
| 2,793,026 | Giardino et al. | May 21, 1957 |